June 14, 1932.  W. E. WINE  1,863,262
RAILWAY HOPPER CAR
Filed Sept. 2, 1930   2 Sheets-Sheet 1
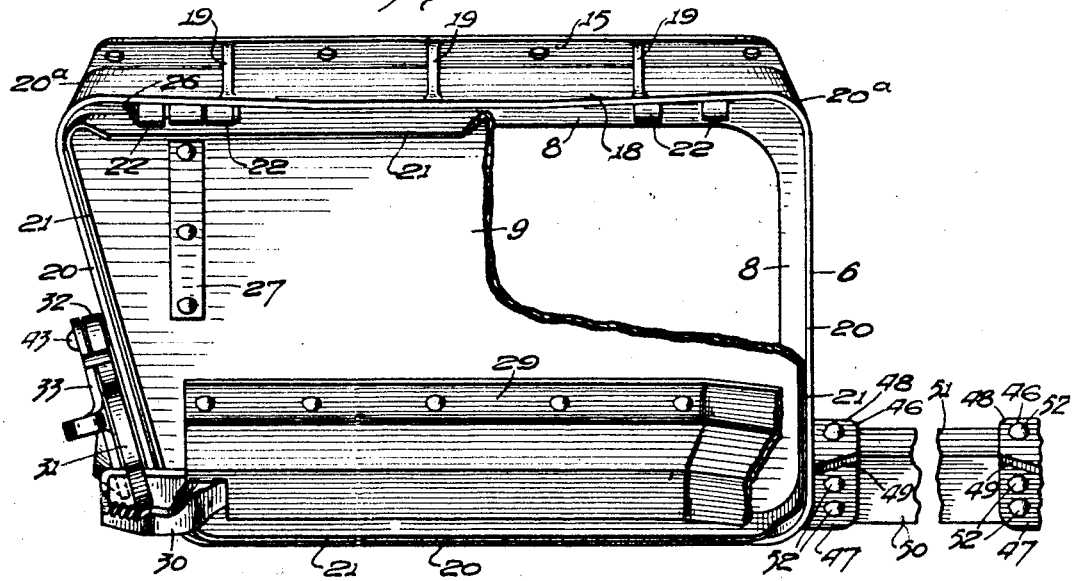
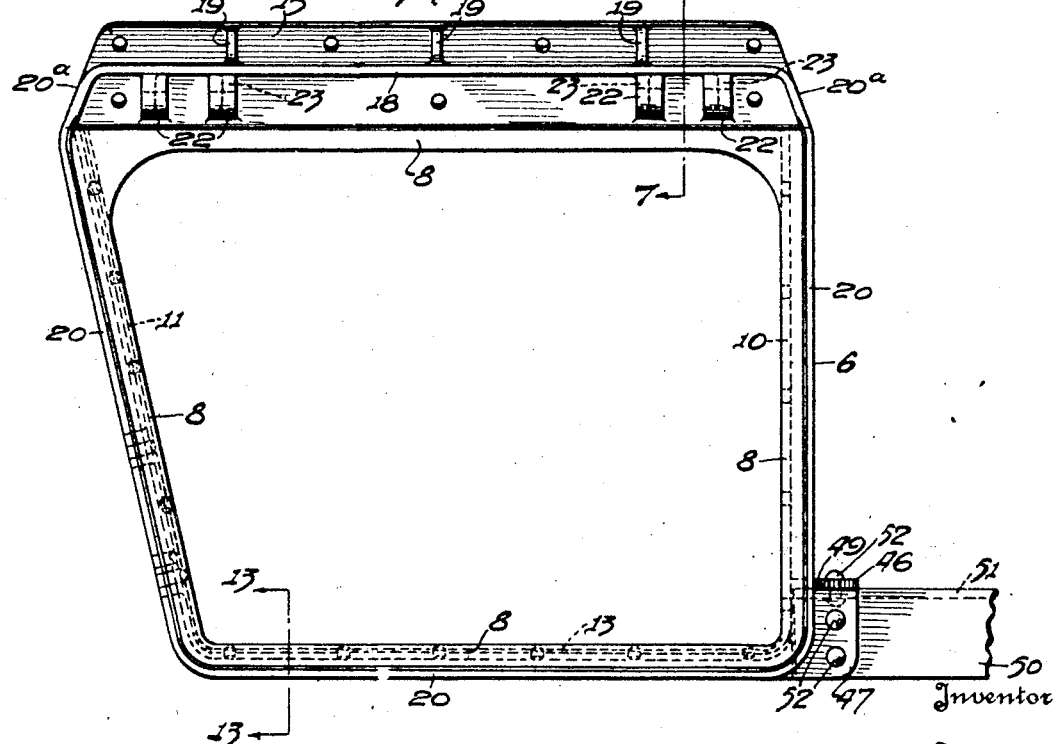
Inventor
William E. Wine
By Ritter & Mechlin
his Attorneys

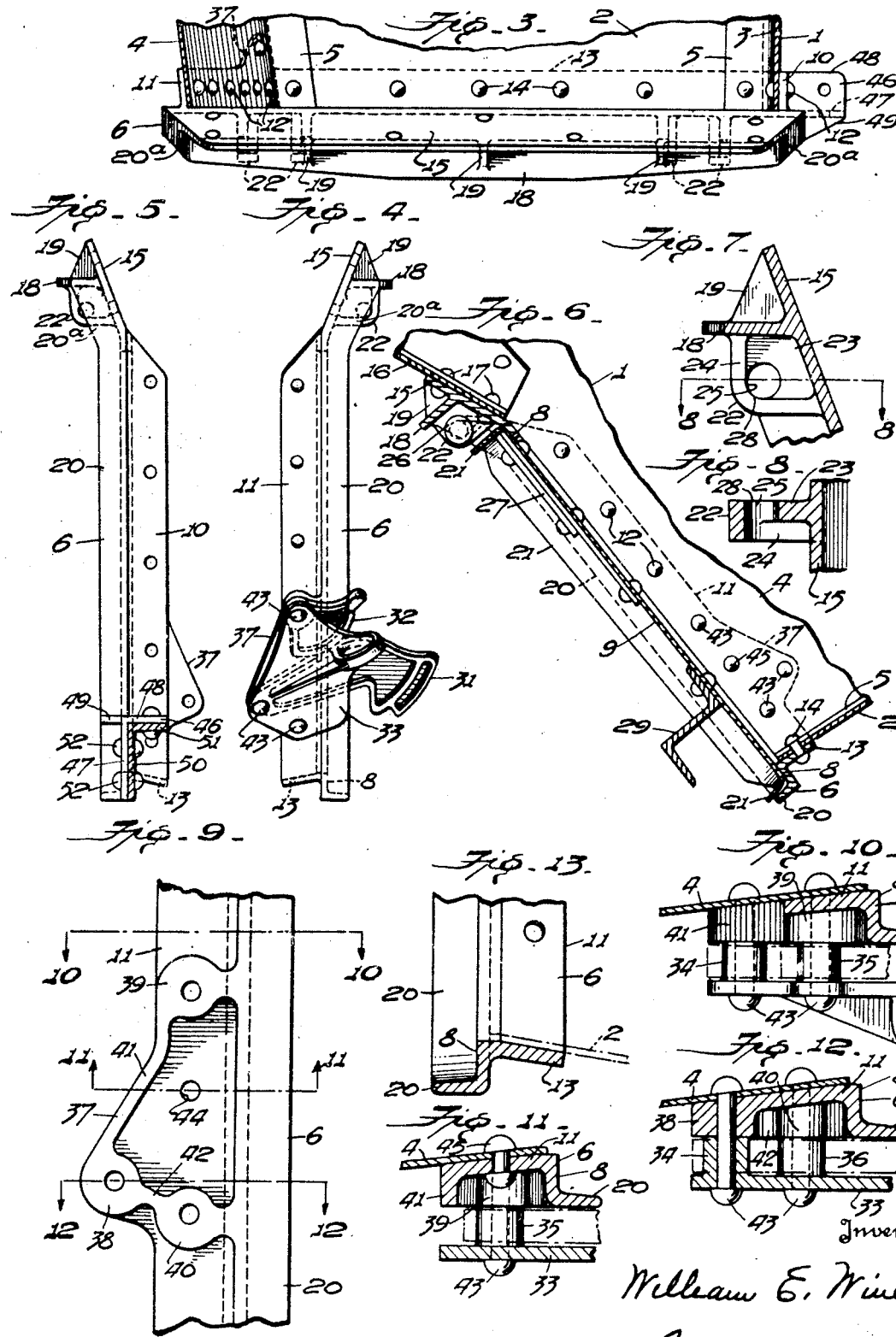

Patented June 14, 1932

1,863,262

UNITED STATES PATENT OFFICE

WILLIAM E. WINE, OF TOLEDO, OHIO

RAILWAY HOPPER CAR

Application filed September 2, 1930. Serial No. 479,366.

My invention relates to railway cars and more particularly to door frames for cars of the hopper type. The principal object of the invention is to provide a door frame of simple and rugged construction and one which may be conveniently connected to the frame of an adjacent hopper.

A primary feature of the invention consists in providing the door frame with a laterally projecting bracket adapted to be rigidly secured to a beam for tying together the hoppers disposed on opposite sides of the car center sill.

Another feature of the invention consists in providing the frame adjacent its lower corner with a bracket having angularly disposed portions for attachment to a beam for connecting the hoppers on opposite sides of the center sill.

A further feature of the invention consists in providing a door frame having a door seat portion with a laterally projecting bracket formed with a portion disposed substantially in the plane of the door seat portion for attachment to a beam for connecting the hoppers on opposite sides of the center sill.

A still further feature of the invention consists in providing the door frame with a door seat portion, a flange extending inwardly from adjacent the inner edge of the seat portion for attachment to a side sheet of the hopper and a flange extending outwardly from adjacent the outer edge of the door seat portion constituting a door sealing flange, the side sheet attaching flange being integrally formed with laterally projecting portions affording a mounting for a door supporting mechanism.

A still further feature of the invention consists in integrally forming the door frame with a hinge lug having a web portion apertured to receive a pin for hingedly connecting a door to the frame and a flange partially surrounding the aperture to afford an extended bearing area for the pin.

Other and more specific features of the invention residing in advantageous forms, combinations and relations of parts will hereinafter appear and be pointed out in the claims.

In the drawings illustrating a preferred embodiment of the invention

Figure 1 is a front elevational view of the door frame and cooperating parts in the position they occupy when mounted on the car, the view being taken on a horizontal line.

Figure 2 is a front elevational view of the door frame and connecting beam, the parts being viewed in a direction normal to the plane of the lading discharge opening of the frame.

Figure 3 is a plan view of the frame showing adjacent portions of the hopper sheets.

Figure 4 is an outside side elevational view of the door frame and the door supporting mechanism.

Figure 5 is an inside side elevational view of the frame, the connecting beam being shown in section.

Figure 6 is a longitudinal vertical sectional view through the central portion of the hopper and door frame.

Figure 7 is an enlarged sectional view taken on line 7—7, Figure 2.

Figure 8 is a sectional view taken on line 8—8, Figure 7.

Figure 9 is an enlarged side elevational view of the outside of the frame adjacent the portion thereof to which the door supporting mechanism is attached.

Figures 10, 11 and 12 are detail sectional views taken on lines 10—10, 11—11 and 12—12, Figure 9, the cover plate of the door supporting mechanism being shown.

Figure 13 is an enlarged sectional view taken on line 13—13, Figure 2.

As is well known there are generally two types of hopper cars, namely, the side dump type, that is, those in which the hinge axes of the hopper doors extend longitudinally of the car, and the center dump type, that is, those in which the hinge axes of the doors extend transversely of the car. My invention primarily relates to the last named type but as the description proceeds it will be readily appreciated that it is capable of application to the cars of the other type.

Referring more particularly to the drawings, 1 indicates a portion of a hopper which, as is customary, is formed with a slope sheet 2 and inner and outer side sheets 3 and 4, the side sheets being formed with inturned flanges 5 overlappingly secured to the slope sheet. Although the outer side sheet inclines downwardly and inwardly it is preferred that the inner side sheet be disposed in a substantially vertical plane.

Secured to the hopper at its discharge end is a door frame 6 which may advantageously be formed as an integral casting. The frame is preferably of substantially trapezoidial form, and is provided with a similarly shaped lading discharge opening. Bordering the upper and lower edges of the opening, as well as the side edges thereof, is a portion 8 forming a seat for a door 9 which is hingedly associated with the frame for closing the opening. Extending inwardly from adjacent the inner edges of the door seat portions along the sides of the opening are flanges 10 and 11, respectively, for attachment by rivets 12 to the inner and outer side sheets of the hopper. The frame is also provided with an inwardly extending flange 13 disposed adjacent the inner edge of the door seat portion along the bottom of the opening for attachment by rivets 14 to the slope sheet 2 of the hopper. The upper part of the frame is formed with a plate portion 15 which extends upwardly at a slight angle from the door seat portion along the upper edge of the opening to be rigidly secured to the cross ridge sheet 16 of the hopper by rivets 17. This plate portion may advantageously be reinforced by an outwardly projecting longitudinally extending flange 18 disposed substantially midway between its upper and lower edges and by a plurality of triangularly shaped ribs 19 which extend between the flange 18 and the upper edge of the plate portion. This manner of reinforcing the upper portion of the frame results in a very rigid construction and permits two rows of rivets to be employed for connecting the frame to the cross ridge sheet of the hopper. It is to be noted that, due to the rigidity of the upper portion of the frame, the cross ridge sheet is materially strengthened.

Projecting outwardly from adjacent the outer edges of the door seat portions around the sides and lower edge of the lading discharge opening is a continuously extending flange 20 for cooperating with the outwardly projecting flanges 21 of the sheet metal door 9 to form a seal against the escape of fine lading. Since the sealing flanges extend outwardly from adjacent the outer edges of the door seat portions and the hopper sheet attaching flanges extend inwardly from adjacent the inner edges thereof, it will be perceived that the sides and bottom members of the door frame are of substantially Z shape. The sealing flange 20 preferably continues upwardly above the lading discharge opening and merges, as at 20a, with the reinforcing flange 18.

For hingedly connecting the door with the frame the latter is integrally formed with a plurality of pairs of lugs 22 which are disposed in the angle formed by the reinforcing flange 18 and the lower part of the plate portion 15. Each hinge lug comprises a web portion 23 and laterally projecting marginal flange 24, the web being formed with an aperture 25 for receiving a pin 26 adapted to cooperate with the adjacent hinge strap 27 with which the door may be conveniently provided. To afford an extended bearing area for the hinge pin 26 the aperture 25 is so formed that it is partially bounded by the marginal flange 24 which, as may be seen from the drawings, is provided with an arcuate shaped portion 28. Due to the form of the hinge lugs and the manner in which they are disposed on the frame it will be seen that, in addition to their intended function, they serve to additionally reinforce the upper portion of the frame.

In hopper cars of the center dump type the hoppers are arranged on opposite sides of the car center sill and in order that the doors of adjacent hoppers may swing as one they are usually connected by a beam commonly termed a door spreader. Although only one hopper and its coacting door is illustrated in the drawings the door is shown as being provided with a door spreader 29 which may advantageously be of substantially Z shape. Projecting beyond the end of the spreader is an arm 30 for cooperating with suitable door supporting mechanism which in the present embodiment of the invention, comprises a pivoted hook 31 and a locking cam 32. Overlying the outer face of the hook and cam is a cover plate or bracket 33 which may, if desired, be provided with an outwardly projecting portion affording a fulcrum for removable lever (not shown) for forcing the door to closed or open position. The inner face of the cover plate is formed with bosses 34, 35 and 36, respectively, the boss 34 constituting a pivotal support for the hook and the boss 35 constituting a pivotal support for the cam.

To provide a convenient mounting for the door supporting mechanism the side sheet attaching flange 11 of the door frame is enlarged as at 37 and is formed with a plurality of laterally projecting bosses 38, 39 and 40. The outer surfaces of these bosses are disposed in the same plane as the outer surface of the adjacent portion of the adjoining flange 20 and, in effect, constitute continuations of that surface. The bosses 39 and 40 are disposed adjacent the rear of the door seat portion and are integrally joined thereto while the boss 38 is disposed adjacent the outer edge of the enlarged portion 37 and is connected to the bosses 39 and 40 by flanges or webs 41 and 42 respectively, the flange 41 being preferably disposed along the marginal edge of the side sheet attaching flange. The bosses 38, 39 and 40 as well as the bosses 34, 35 and 36 which abut against them are formed with registerable openings to receive rivets 43 for rigidly securing the cover plate and consequently the hook and cam of the door supporting mechanism to the door frame. By integrally connecting the bosses 38, 39 and 40 to each other and to the door seat portion of the frame it will be perceived that the mounting for the door supporting mechanism strengthens and rigidifies that portion of the frame to which forces incident to supporting the door in closed position are transmitted. To permit of the employment of a maximum number of rivets for attaching the frame to the hopper sheets, the portion of the outer side sheet attaching flange 11 enclosed by the mounting for the door supporting mechanism is provided with an aperture 44 for receiving a rivet 45 which as will be readily observed does not extend through the cover plate 33.

In order that the door frame may be rigidly tied to the frame of the adjacent hopper on the opposite side of the car center sill, it is formed, preferably integrally, with a laterally projecting bracket 46 adjacent its lower corner. This bracket is of angular shape having a flange 47 disposed in a plane substantially parallel with the door seat portion of the frame and a flange 48 extending rearwardly from the flange 47 and integrally connected to the adjacent side sheet attaching flange 10. If desired, the bracket may be rigidified by a portion 49 which extends forwardly from the upper edge of the flange 47 and merges with the adjacent sealing flange 20. Although the beam for tying the hoppers together may be of any convenient form it may advantageously be of an angle shape having flanges 50 and 51 respectively secured by rivets 52 to the flanges 47 and 48 of the bracket. By connecting the door frames of adjacent hoppers in this manner it will be appreciated that a very rigid construction is produced and also one which may be easily repaired.

I claim:

1. A railway hopper car having hoppers disposed on opposite sides of the car center sill, a door frame for each of said hoppers, each of said door frames being integrally formed with an inwardly extending laterally projecting bracket, and means connecting said frames involving a beam rigidly secured to said brackets.

2. A railway hopper car having hoppers disposed on opposite sides of the car center sill, a door frame for each of said hoppers, each of said door frames being integrally formed on its inner side with a laterally projecting bracket having angularly disposed portions, and means connecting said frames involving a beam rigidly secured to the said portions of the brackets.

3. A railway hopper car having hoppers disposed on opposite sides of the car center sill, a door frame for each of said hoppers, each of said frames being integrally formed adjacent its lower corner with an angularly shaped laterally projecting bracket, and a beam rigidly secured to said brackets for connecting said frames.

4. A railway hopper car having hoppers disposed on opposite sides of the car center sill, a door frame for each of said hoppers, each of said frames being provided adjacent its lower inner corner with a laterally projecting substantially angle shaped bracket, and an angle shaped beam rigidly secured to said brackets for connecting the frames.

5. A railway hopper car having hoppers disposed on opposite sides of the car center sill, a door frame for each of said hoppers, each of said frames having a door seat portion, a flange projecting inwardly from the inner edge of the seat portion for attachment to a side sheet of the hopper and a flange projecting outwardly from the outer edge of the seat portion constituting a door sealing flange, a bracket formed integrally with said frame and being provided with a portion disposed in a plane parallel with the door seat portion, and means for connecting said door frames involving a beam rigidly secured to the said portion of each of said brackets.

6. A railway hopper car having hoppers disposed on opposite sides of the car center sill, a door frame for each of said hoppers, each of said door frames including a door seat portion, a flange extending inwardly from said portion for attachment to a side sheet of the hopper and a flange extending outwardly from said portion constituting a door sealing flange, a bracket formed integrally with each of said frames, said bracket having a portion extending outwardly from the side sheet attaching flange of the frame and a portion extending outwardly from the door seat portion thereof, and a beam rigidly secured to each of said portions of the brackets for connecting the frames.

7. A railway hopper car having hoppers disposed on opposite sides of the car center sill, a door frame for each of said hoppers, each of said door frames having a door seat portion, a flange projecting inwardly from the inner edge of the seat portion for attachment to a side sheet of the hopper and a flange projecting outwardly from the outer edge of the seat portion constituting a door sealing flange, a bracket formed integrally with said frame and being provided with a portion disposed substantially in the plane of the door seat portion and a portion extending rearwardly therefrom, and an angle shaped beam secured to the said portions of the brackets for connecting the frames.

8. A door frame for a railway hopper car, said frame being provided with a leading discharge opening, a door seat portion bordering the opening, a flange projecting inwardly from adjacent the inner edge of the door seat portion for attachment to a side sheet of the hopper, said flange being integrally formed with laterally projecting portions constituting a mounting for a door supporting mechanism, said mounting being integrally joined to the said door seat portion.

9. A door frame for a railway hopper car, said frame being provided with a lading discharge opening, a door seat portion bordering the opening, a flange projecting inwardly from adjacent the inner edge of the door seat portion for attachment to a side sheet of the hopper, and a mounting for a door supporting mechanism formed integrally with said side sheet attaching flange, said mounting including a plurality of apertured bosses.

10. A door frame for a railway hopper car, said frame being provided with a lading discharge opening, a door seat portion bordering the opening, a flange projecting inwardly from adjacent the inner edge of the door seat portion for attachment to a side sheet of the hopper, and a plurality of outwardly extending bosses formed integrally with the said side sheet attaching flange affording a mounting for a door supporting mechanism, two of said bosses being disposed adjacent the said door seat portion and being formed integrally therewith.

11. A door frame for a railway hopper car, said frame being provided with a lading discharge opening, a door seat portion bordering the opening, a flange projecting inwardly from adjacent the inner edge of the door seat portion for attachment to a side sheet of the hopper, said side sheet attaching flange being formed with a plurality of outwardly projecting bosses affording a mounting for a door supporting mechanism, said bosses being integrally connected.

12. A door frame for a railway hopper car, said frame being provided with a lading discharge opening, a door seat portion bordering the opening, a flange projecting inwardly from adjacent the inner edge of the door seat portion for attachment to a side sheet of the hopper, and a plurality of laterally projecting bosses formed integrally with the said side sheet attaching flange affording a mounting for a door supporting mechanism, two of said bosses being connected by a flange disposed at the free edge of said side sheet attaching flange.

13. A door frame for a railway hopper car, said frame being provided with a lading discharge opening, a door seat portion bordering the opening, a flange extending inwardly from adjacent the inner edge of the door seat portion for attachment to a side sheet of the hopper, a flange extending outwardly from adjacent the outer edge of the door seat portion constituting a door sealing flange, said side sheet attaching flange being integrally formed with laterally projecting portions affording a mounting for a door supporting mechanism, the outer surface of said mounting constituting a continuation of the outer surface of the said sealing flange.

14. A hopper car door frame having a lading discharge opening, in combination with a door for closing the opening, said frame being integrally formed with a hinge lug adapted to receive a pin for hingedly connecting the door to the frame, said lug including a web portion and a laterally projecting flange bounding the web, said web being provided with a pin receiving aperture and said flange bordering a portion of said aperture whereby the pin is adapted to have bearing engagement with the flange.

15. A hopper car door frame having a lading discharge opening, in combination with a door for closing the opening, said frame being integrally formed with a hinge lug adapted to receive a pin for hingedly connecting the door to the frame, said lug having a web and a laterally projecting marginal flange, said web being provided with a pin receiving aperture and said flange having an arcuate shaped portion bordering a portion of the aperture whereby the pin is adapted to have bearing engagement with the flange.

16. A hopper car door frame having a lading discharge opening, in combination with a door for closing the opening, said frame being provided with a plurality of pairs of hinge lugs adapted to receive pins for hingedly connecting the door to the frame, each of said lugs having a web portion provided with a pin receiving aperture and a laterally projecting flange bordering a portion of said aperture, the flange of each lug projecting toward the other lug of its pair.

In testimony whereof I affix my signature.

WILLIAM E. WINE.